Nov. 6, 1962    E. M. WETMORE    3,062,461
GRINDING AND MIXING APPARATUS
Filed April 11, 1960    3 Sheets-Sheet 1

INVENTOR.
E. M. WETMORE
BY
*Jerry J. Dunlap*
ATTORNEY

Nov. 6, 1962
E. M. WETMORE
3,062,461
GRINDING AND MIXING APPARATUS
Filed April 11, 1960
3 Sheets-Sheet 2
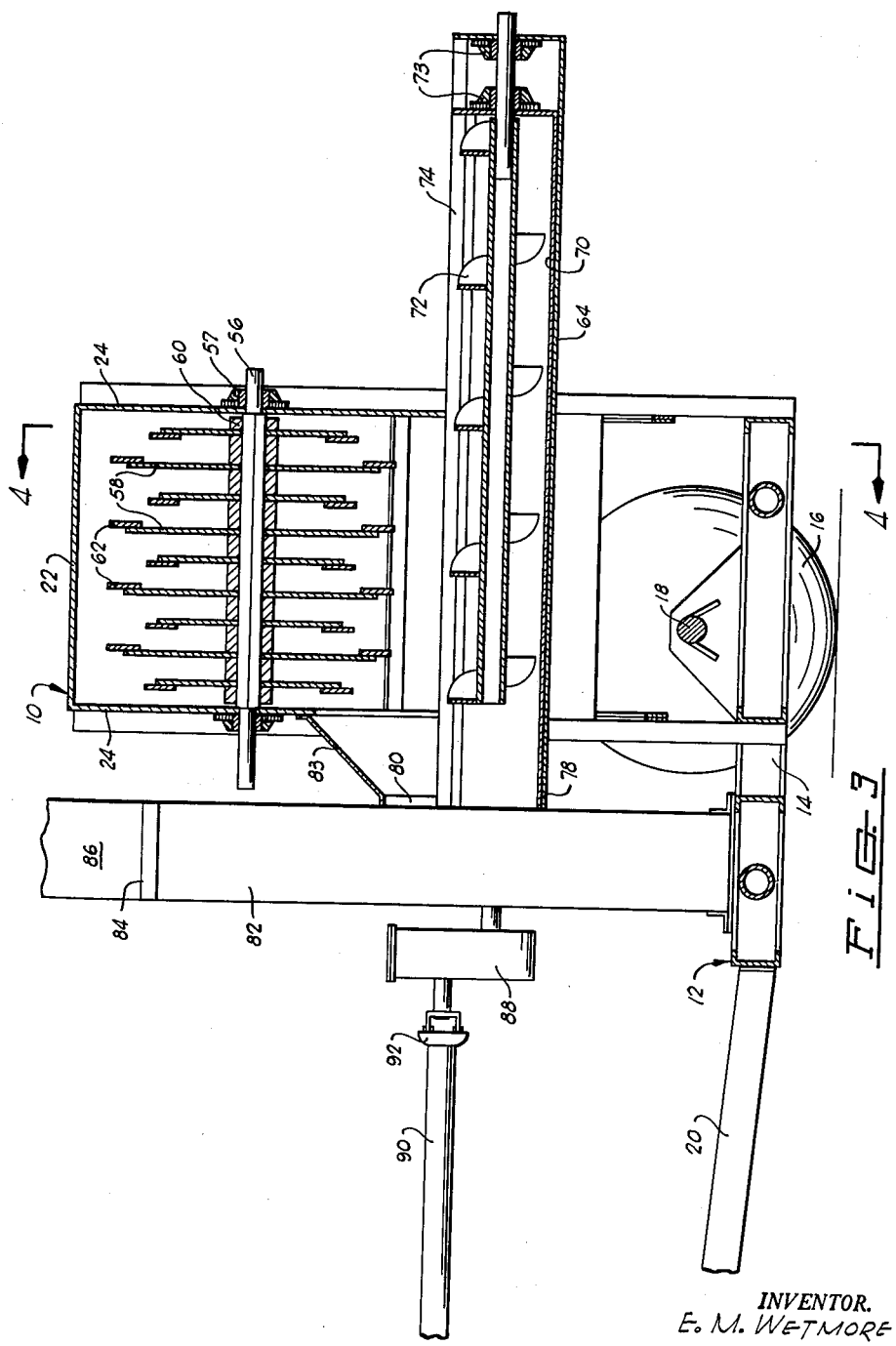
INVENTOR.
E. M. WETMORE
BY
ATTORNEY Nov. 6, 1962   E. M. WETMORE   3,062,461
GRINDING AND MIXING APPARATUS
Filed April 11, 1960   3 Sheets-Sheet 3
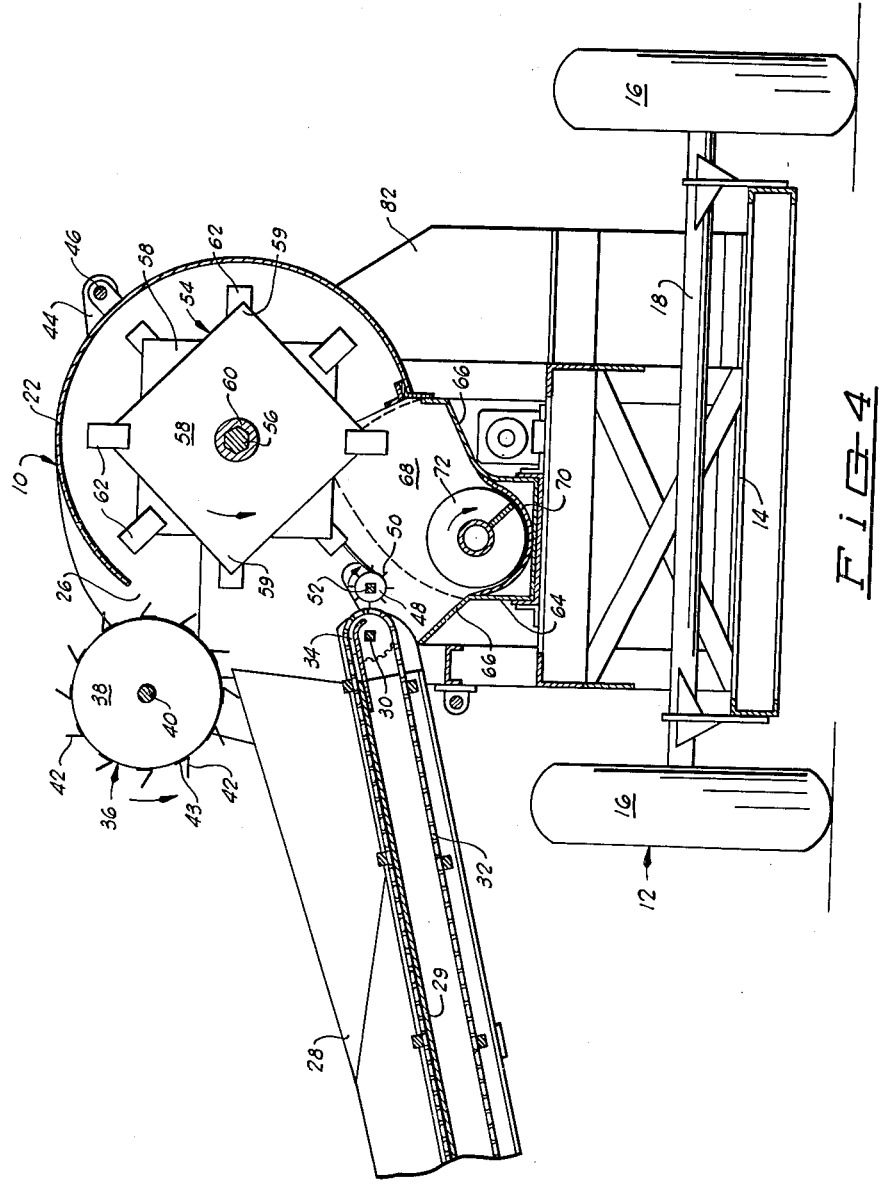
INVENTOR.
E. M. WETMORE
BY
Jerry J. Dunlap
ATTORNEY United States Patent Office 3,062,461
Patented Nov. 6, 1962

3,062,461
GRINDING AND MIXING APPARATUS
Earnest M. Wetmore, Box 307, Tonkawa, Okla.
Filed Apr. 11, 1960, Ser. No. 21,259
6 Claims. (Cl. 241—98)

This invention relates generally to improvements in apparatus used for grinding and mixing feed, such as cattle feed, and more particularly, but not by way of limitation, to an improved apparatus for grinding and mixing baled hay and grain, such as corn.

As it is well known in the art, a mixture of ground hay and ground grain makes a highly desirable cattle feed. The usual method employed to provide such a mixture involves a separate grinding of the hay and the grain and then a mixing of the hay and grain in a suitable mixing apparatus. The hay is ordinarily ground by use of a hammer mill. However, hay must be fed to a hammer mill in a relatively even stream (not in large bunches) to prevent overloading of the hammer mill and resultant damage either to the hammer mill or the drive system for the hammer mill. Therefore, the hay is normally fed into the hammer mill in a loosened condition, and when baled hay is being ground, the bales and the flakes of the bales are manually broken up before the hay is fed into the hammer mill. It may also be noted that it is common practice to provide a feed roller above the inlet of a hammer mill which tends to regulate the amount of hay which can be fed into the mill for preventing overloading of the mill.

The present invention contemplates a novel grinding and mixing apparatus which will readily receive and handle baled hay and which provides both grinding and mixing of hay with grain in the same apparatus. In use of the present apparatus, it is simply necessary to remove the wires or strings holding the flakes of a bale of hay together before the hay is fed to the apparatus. The flakes of the baled hay are moved one at a time into contact with a deflaking device which loosens the hay but does not provide any appreciable cutting or grinding of the hay. The loosened hay is then fed into a suitable grinder, such as a hammer mill, in a substantially uniform stream to provide the most efficient operation of the hammer mill. When the apparatus is also used as a mixing device, the grain is mixed with the hay which has been loosened by the deflaking device and moved by an auger type of conveyor in a substantially uniform stream into the hammer mill.

Broadly stated, the present invention may be defined as a grinding and mixing apparatus for feed, including baled hay, comprising a housing having an inlet in one side thereof of a size to receive flakes of a bale of hay and having an outlet in the lower portion thereof, means for feeding flakes of bales of hay through said inlet one at a time, a deflaking device rotatably supported in said housing for breaking up each of said flakes fed into said housing and discharging the loosened hay downwardly through said outlet, a hammer mill supported adjacent said housing, a conveyor supported below said outlet and extending to said hammer mill for feeding said loosened hay into said hammer mill, and means for driving said deflaking device, conveyor and hammer mill.

An important object of this invention is to provide an apparatus for grinding baled hay, with the minimum of manual work being required to prepare the baled hay for grinding.

Another object of this invention is to provide an apparatus which will accommodate and grind flakes of baled hay.

A further object of this invention is to provide a combination grinding and mixing apparatus for both grinding and mixing hay and grain.

Another object of this invention is to provide a grinding and mixing apparatus for hay and grain or the like utilizing a hammer mill as the grinder portion of the apparatus and wherein a substantially uniform stream of materials will be fed to the hammer mill.

Another object of this invention is to provide a complete grinding and mixing apparatus for producing a mixture of ground hay and ground grain and which is portable and easily movable from one location to another without damage to the apparatus.

A still further object of this invention is to provide a hay and grain grinding and mixing apparatus which is simple in construction, may be economically manufactured and which will have a long service life.

Other objects and advantages of the invention will be evident from the following detailed description, when read in conjunction with the accompanying drawings which illustrate my invention.

In the drawings:

FIGURE 3 is a vertical sectional view taken longitudinally through the apparatus, with portions of the apparatus shown in elevation and with the drive system removed to more clearly illustrate the invention.

FIGURE 4 is a transverse vertical sectional view as taken along lines 4—4 of FIG. 3 with portions shown in elevation and portions removed as in FIG. 3.

Figure 1:
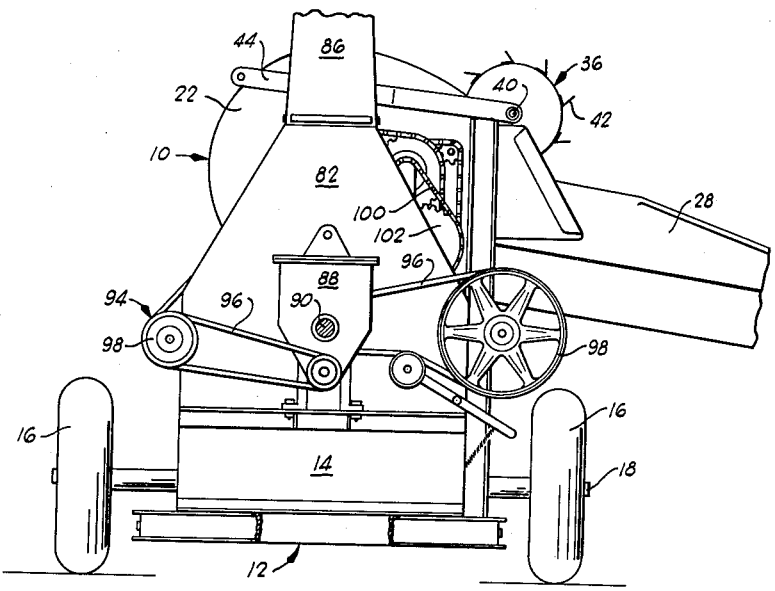
FIGURE 1 is an end view of an apparatus constructed in accordance with this invention.

Referring to the drawings in detail, reference character 10 generally designates a grinding and mixing apparatus mounted on a trailer 12. The trailer 12 comprises a suitable framework 14 supported by wheels 16 on the opposite ends of an axle 18. A suitable tongue 20 (FIG. 3) extends forwardly from the framework 14 for connection with a tractor or the like (not shown) to move the apparatus 10 from one location to another.

The apparatus 10 includes a cylindrical housing 22 (see also FIG. 4) supported in a substantially horizontal position on the framework 14 of the trailer 12 and having substantially flat end walls 24 at the opposite ends thereof. A substantial portion of one side of the housing 22 is removed to provide an inlet 26 (FIG. 4) of a size to receive the flakes of a bale of hay, as will be described. A feeding or loading chute 28, which is open along its top and having a bottom wall 29, is pivotally secured to the housing 22 by a shaft 30 in a position to extend outwardly from the inlet 26 of the housing 22. In a normal operation of the apparatus 10, the chute 28 is supported by a suitable support leg (not shown) adjacent the outer end of the chute, such that the chute 28 extends upwardly from slightly above ground level to the inlet 26. A chain type drag conveyor 32 extends through the lower portion of the chute 28 for moving hay through the chute 28 toward the inlet 26. The chains at one end of the conveyor 32 extend around sprockets 34 mounted on the shaft 30, and the chains at the opposite ends (not shown) of the conveyor 32 extend around corresponding sprockets rotatably secured to the outer end of the chute 28. The shaft 30 is driven to operate the conveyor 32, as will be described.

A primary feed roller, generally designated by reference character 36, is carried by the housing 22 in a position to extend into the innermost end of the chute 28 adjacent the inlet 26 for moving flakes of baled hay into the inlet 26, as will be described. The feed roller 36 comprises a drum 38 rigidly secured on a shaft 40 and having a plurality of teeth 42 secured around the outer periphery of the drum. The teeth 42 all extend at an acute angle from the periphery of the drum 38 in such a direction that the teeth 42 extend generally upward on the downwardly moving side of the drum 38 when the drum 38 is rotated counter-clockwise as viewed in FIG. 4, and as indicated by the arrow adjacent the drum. Therefore, the teeth 42 will engage a flake of baled hay being moved by the conveyor 32 and will force the flakes through the inlet 26, yet the teeth 42 will not tend to lift the flake at the upwardly moving side of the drum 38. In other words, the teeth 42 will effectively move a flake of hay from the chute 28 into the inlet 26, yet the teeth will be easily disengaged from the flake of hay as the teeth are moved upwardly by rotation of the drum 38. In a preferred embodiment, the teeth 42 are formed in longitudinal rows extending along the length of the drum 38, such that the teeth 42 in each row may be easily formed from a metal bar 43 and provide the most economical construction. The opposite ends of the shaft 40 are journaled in arms 44 pivotally secured to the housing 22 by a shaft 46, such that the feed roller 36 will tend to remain in the chute 28 by the action of gravity, yet the feed roller 36 is free to move relatively upward and downward to accommodate various sizes of flakes of hay. The shaft 40 is driven by a suitable drive system, as will be described, to rotate the drum 38 in the direction indicated by the arrow in FIG. 4.

A secondary feed roller 48, having circumferentially-spaced radial teeth 50 on the outer periphery thereof, is rigidly secured on a shaft 52 journaled in the housing 22 parallel with the longitudinal axis of the housing 22. The secondary feed roller 48 is positioned at a level substantially corresponding to the level of the bottom 29 of the chute 28 and at the level of the conveyor 32 at the inner end of the chute 28, to extend transversely across the lower portion of the inlet 26. The secondary feed roller 48 engages the lower surface of a flake of hay being moved by the primary feed roller 36 to facilitate movement of the flake into engagement with a deflaking device, generally designated by reference character 54. It may also be noted that the teeth 50 of the secondary feed roller 48 may extend radially from the feed roller, since the hay contacted by the deflaking device 54 is moved downwardly, as will be described. The secondary feed roller 48 is turned in a direction opposite to the direction of rotation of the primary feed roller 36 by a suitable drive system connected to the shaft 52, as will be described.

The deflaking device 54 comprises a hexagonal shaft 56 journaled in the opposite ends 24 of the housing 22 by suitable bearings 57 (FIG. 3) to extend along the longitudinal axis of the housing 22. A plurality of square plates 58 are secured around the shaft 56 within the housing 22 in longitudinally-spaced relation along the length of the shaft 56. Each plate 58 has a hexagonal aperture in the central portion thereof mating with the shaft 56 to provide rotation of the plates 58 with the shaft 56, and the plates 58 are held in spaced relation by suitable spacer washers 60 positioned between adjacent plates and positioned between the endmost plates and the opposite ends 24 of the housing 22. It will also be observed in FIG. 4 that adjacent plates 58 are turned forty-five degrees with respect to one another to position the corners 59 of adjacent plates 58 in staggered relation as viewed lengthwise along the shaft 56. A beater bar 62 is secured to each corner 59 of each plate 58 in any suitable manner to extend radially with respect to the shaft 56. Each beater bar 62 is of a size to move freely in the housing 22 and in spaced relation from the secondary feed roller 48 during rotation of the shaft 56. The edges of each beater bar 62 may be flat, since the deflaking device 54 is intended merely to loosen the hay in the flakes being fed thereto by the feed rollers 36 and 48, and not to provide any appreciable cutting or grinding of the hay. The shaft 56 is rotated counter-clockwise as viewed in FIG. 4, and as indicated by the arrow in FIG. 4, to move the beater bars 62 downwardly across the inlet 26 and adjacent the secondary feed roller 48.

An elongated housing 64 is suitably supported on the trailer framework 14 underneath the housing 22 and extends parallel with the longitudinal center line of the housing 22, but in horizontally offset relation with respect to the center line of the housing 22. Portions of the sidewalls 66 of the housing 64 are flared or tapered outwardly and connected to spaced portions of the housing 22 on opposite sides of an outlet 68 formed in the lower portion of the housing 22. It will therefore be apparent that the sidewalls 66 form a chute for guiding hay falling through the outlet 68 into the housing 64. It will also be apparent by an examination of FIG. 4 that the outlet 68 extends underneath the downwardly moving side of the deflaking device 54 and normally extends underneath at least a portion of the inlet 26.

A semi-circular shaped trough 70 is suitably supported in the elongated housing 64 to cooperate with an augur 72 for moving hay and grain lengthwise through the housing 64, as will be described. One end of the auger 72 is supported by suitable bearings 73 (FIG. 3) mounted in the respective end of the housing 64, and the auger is turned in a clockwise direction as viewed in FIG. 4 by a suitable drive system, which will be described. As clearly shown in FIG. 3, the housing 64, trough 70 and auger 72 are substantially longer than the housing 22, such that one end 74 of the housing 64 projects beyond the respective end of the housing 22. The end portion 74 of the housing 64 forms a receptacle for grain which it is desired to be mixed and ground with the hay loosened by the deflaking device 54, such that the grain will be moved through the trough 70 by the auger 72 in a direction underneath the outlet 68 of the housing 22. It may also be noted that the auger 72 provides at least a partial mixing of the grain with the hay loosened by the deflaking device 54. The opposite end 78 of the housing 64 is suitably connected to the inlet 80 of a grinder 82, which is preferably in the form of a hammer mill. The trough 70 extends through the housing 64 to the inlet 80 of the grinder 82, and the auger 72 extends at least to the end 24 of the housing 22 adjacent the grinder 82 for forcing the hay and grain into the grinder 82 when the auger 72 is turned clockwise as viewed in FIG. 4. It may also be noted that a suitable baffle 83 is extended between the inlet 80 of the grinder 82 and the adjacent end wall 24 of the housing 22 to prevent the entrance of foreign materials into the housing 64 and prevent the escape of hay or grain from the housing 64 as the hay and grain are being conveyed by the auger 72.

The grinder 82 may be of any desired type or construction, and, as indicated above, is preferably in the form of a hammer mill, which will efficiently grind both hay and grain and provide an intimate mixture of these ground materials. When the grinder 82 is in the form of a hammer mill, the ground and mixed hay and grain are discharged through an outlet 84 at the top of the hammer mill and are then normally conveyed through a discharge conduit 86 and dust collector (not shown) either to storage or to the point of use, as is the common procedure in the use of hammer mills. A gear box 88 is suitably mounted on the hammer mill 82 and is connected to a forwardly extending drive shaft 90 through a suitable universal joint 92, such that the hammer mill 82 may be driven from a power take-off of the tractor used for pulling the trailer 12 and apparatus 10.

Figure 2:
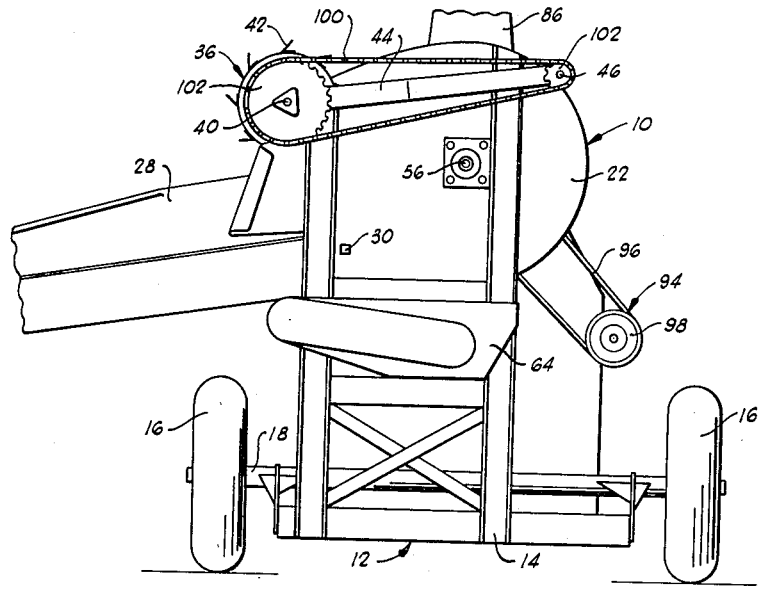
FIGURE 2 is an elevational view at the end of the apparatus opposite the end shown in FIG. 1.

In a preferred embodiment of this invention, the same power source used for driving the hammer mill 82 is also utilized for driving the remainder of the moving portions of the apparatus 10. As illustrated in FIGS. 1 and 2, a drive system, generally designated by reference character 94, is connected to the gear box 88 for driving the conveyor 32, primary feed roller 36, secondary feed roller 48, deflaking device 54 and the auger 72. The drive system 94 comprises the necessary belts 96, pulleys 98, chains 100, and sprockets 102 for turning the shafts 30, 40, 52 and 56 and the auger 72 in the desired directions as described above.

Operation

In preparing the apparatus 10 for operation, the chute 28 is supported by the support leg at the outer end of the chute to extend the chute from slightly above ground level upwardly to the inlet 26, as illustrated in FIGS. 1, 2 and 4. The drive shaft 90 is then energized by the tractor used for pulling the trailer 12 to energize the gear box 88 and hammer mill 82, as well as the drive system 94. During operation of the drive system 94, the various portions of the apparatus 10 will be driven in the directions indicated by the arrows in FIG. 4. The apparatus 10 is then ready for grinding and mixing hay and grain.

When hay in the form of bales is to be ground, the bales are manually or otherwise suitably loaded onto the conveyor 32 in the chute 28 and the wires or cords used for holding the flakes of the bales together are severed and removed. The cords or wires can be severed and removed as the conveyor 32 is moving each bale upwardly through the chute 28 toward the inlet 26.

As the hay is engaged by the primary feed roller 36, this feed roller presses downwardly on the hay and moves only one flake at a time into the inlet 26. In other words, the engagement of the teeth 42 with the hay, in cooperation with the downward force imposed on the hay by virtue of the weight of the feed roller 36, regulates the flow of hay into the inlet 26, such that one flake at a time is fed through the inlet 26. Each flake engaged by the primary feed roller 36 will also be engaged by the secondary feed roller 48 for moving the flake into the path of movement of the beater bars 62 of the deflaking device 54.

Each of the beater bars 62 will provide a downwardly acting blow on the flake to loosen the hay or break up the flake and direct the loosened hay downwardly through the outlet 68. The loosened hay falling through the outlet 68 is immediately contacted by the auger 72 and moved toward the hammer mill 82, such that the auger 72 will provide a substantially constant stream of hay being fed to the hammer mill 82, providing of course, that flakes of hay are continuously available to the primary feed roller 36. In any event, however, the auger 72 will prevent the feeding of a large amount of hay into the hammer mill 82 at any one time, such that the hammer mill 82 will not become overloaded.

When it is desired to mix and grind grain along with the hay, the grain is fed into the outer end portion 74 of the housing 64 by any suitable means, but preferably in a substantially uniform stream. The grain will be moved through the trough 70 by the auger 72 to join with hay discharging from the housing 22 through the outlet 68. As the grain and loosened hay are moved through the trough 70, the auger 72 provides at least a partial mixing of the hay and grain prior to the time the hay and grain are fed through the inlet 80 of the hammer mill 82. The hammer mill 82 grinds the hay and grain to the desired fineness and completes the mixing of the hay and grain. As previously indicated, the hammer mill 82 discharges the ground and mixed hay and grain through the outlet 84 and the discharge conduit 86, either to storage or to the point of use, as will be readily understood by those skilled in the art. In connection with the operation of the auger 72, it may also be noted that when a substantially uniform stream of grain is fed into the end 74 of the housing 64 and when a constant stream of hay is fed to the deflaking device 54, the auger 72 will feed uniform proportions of the hay and grain into the hammer mill 82, such that the hammer mill 82 may be designed for the most efficient operation and extended service life.

When it is desired to move the apparatus 10 from one location to another, the chute 28 may be pivoted upwardly on the shaft 30, and the support leg pivoted into contact with the bottom of the chute 28. Also, the arms 44 supporting the primary feed roller 36 may be pivoted upwardly on the shaft 46, such that the apparatus 10 will occupy the minimum horizontal area and the entire apparatus 10 be positioned between the wheels 16 of the trailer 12. The chute 28 and primary feed roller 36 may be supported in substantially vertical positions by suitable connectors (not shown) extending from the discharge conduit 86 of the hammer mill 82.

From the foregoing it will be apparent that the present invention provides a novel apparatus which will receive and effectively grind baled hay, with the minimum of manual work required for preparing the baled hay for the grinding operation. When baled hay is used, the flakes of the bales of hay are fed into the device one at a time and the flakes are broken up to provide the hay in a loosened condition before it is fed into the hammer mill or other grinding apparatus. The present apparatus may be used to provide an effective grinding and mixing of hay and grain, and the proportions of the hay and grain may be easily controlled to provide the desired final mixture. The material being fed to the hammer mill of the apparatus will be in the form of a uniform stream to prevent the hammer mill from becoming overloaded. It will also be apparent that the present invention provides a novel mixing and grinding apparatus which is simple in construction, may be economically manufactured and will have a long service life.

Changes may be made in the combination and arrangement of parts or elements as heretofore set forth in the specification and shown in the drawings, it being understood that changes may be made in the embodiment disclosed without departing from the spirit and scope of the invention as defined in the following claims.

I claim:
1. A portable grinding and mixing apparatus for grinding and mixing hay with corn or the like comprising:

a trailer including a framework having wheels mounted on opposite sides thereof for supporting said apparatus;

a housing mounted on said framework having an inlet in one side thereof of a size to receive flakes of a bale of hay and having an outlet in the lower portion thereof;

chute means pivotally attached to said housing adjacent said inlet for pivotation about a horizontal axis between an operative position in which said chute means extends outwardly and downwardly from said opening to the ground, and a portable retracted position in which such chute means extends upwardly from said inlet and effectively closes said inlet;

a pair of parallel, spaced arms pivotally secured at one of their ends to said housing and unattached at their ends opposite said pivotally secured ends to permit free movement about the axis of pivotation of said arms, the pivotal axis of said arms extending substantially parallel to the horizontal axis of pivotation of said chute means whereby said arms and said chute means may be pivoted upwardly into a substantially parallel position when said grinding and mixing apparatus is to be transported on said wheels;

a primary feed roller rotatably journaled between said arms at the unattached ends thereof and positioned adjacent said inlet and over said chute means in one position of said arms for feeding flakes of hay through said inlet from a bale of hay on said chute means;

a deflaking device rotatably supported in said housing for loosening each of said flakes fed into said housing and for discharging the deflaked hay downwardly through said outlet;

a hammer mill supported between said wheels on said framework adjacent said housing;

a trough supported by said framework under said outlet and between said wheels in a position to receive loosened hay discharged through said outlet and communicating at one of its ends with the interior of said hammer mill and having its other end positioned for receiving a material to be mixed with said deflaked hay; and conveyor means in said trough for mixing deflaked hay and said material introduced to said trough for mixing with said hay.

2. A portable grinding and mixing apparatus for feed, including baled hay, comprising:

a wheeled framework;

means for connecting said framework to a tractor vehicle;

a housing mounted on same framework having an inlet in one side thereof of a size to receive flakes of a bale of hay and having an outlet in the lower portion thereof;

means for presenting a bale of hay at said inlet;

a primary feed roller rotatably mounted on said housing and positioned adjacent said inlet;

a plurality of parallel teeth secured around the periphery of said roller extending at identical acute angles to radii of said roller, said teeth all being extended in the same direction;

a shaft rotatably supported in said housing opposite said inlet;

a plurality of blunt beater bars carried by said shaft in staggered relation along said shaft in positions for movement downwardly adjacent said inlet toward said outlet upon rotation of said shaft in one direction whereby said hay flakes may be loosened without substantial cutting of the hay;

a secondary feed roller rotatably supported in said housing across said inlet inwardly of said primary feed roller and in spaced relation from the path of movement of said beater bars;

teeth extending radially from said secondary feed roller toward the shaft carrying said beater bars for moving flakes of hay from said primary feed roller into the paths of said beater bars;

a hammer mill supported on said wheeled framework adjacent said housing;

a trough supported by said framework under said outlet in a position to receive loosened hay discharged through said outlet and communicating at one of its ends with the interior of said hammer mill and having its other end positioned for receiving a material to be mixed with said loosened hay;

conveyor means in said trough for mixing loosened hay and said material introduced to said trough for mixing with said hay; and means for driving said shaft, hammer mill, and the primary and secondary feed rollers from a common power source whereby the moving elements of said grinding and mixing device may be operated by power delivered from a tractor vehicle.

3. Apparatus as claimed in claim 2 and further characterized to include:

a pair of parallel, spaced arms supported as cantilevers from said housing and pivotal about a horizontal axis at their ends secured to said housing, said arms rotatably journaling said primary feed roller at their free ends whereby said arms and primary feed roller may be pivoted upwardly over said housing when said apparatus is to be transported;

and wherein said means for presenting a bale of hay at said inlet comprises:

an elongated chute pivotally attached at one of its ends to said housing adjacent said inlet for pivotation about a horizontal axis between an operative position in which said chute means extends outwardly and downwardly from said opening to the ground, and a portable, retracted position in which said chute means extends upwardly from said inlet and effectively closes said inlet; and a conveyor mounted in said chute for conveying a bale of hay along said chute toward said inlet and movable with said chute to a retracted, portable position.

4. In a grinding and mixing apparatus for feed, including baled hay, the improvement which comprises:

a cylindrical housing supported in a substantially horizontal position having an inlet in one side thereof of a size to receive flakes of bales of hay and having an outlet in the lower portion thereof;

a chute extending into said inlet, said chute being open along its top;

a conveyor in said chute for moving hay into said inlet;

a pair of parallel, spaced, elongated arms pivotally secured to said housing at one of their ends and supported as cantilevers from said housing;

a drive shaft rotatably journaled between the free ends of said arms opposite the secured ends of said arms;

a cylindrical drum rigidly mounted on said drive shaft in a position to extend into the top of said chute adjacent said inlet in contact with hay being moved toward said inlet by said conveyor;

a plurality of parallel teeth secured around the periphery of said drum extending at identical acute angles from the periphery of said drum, said teeth all being extended in the same direction;

drive means for rotating said drive shaft and the drum mounted thereon in such a direction that said teeth extend substantially upward on the downwardly moving side of said drum whereby individual flakes of hay are fed through said inlet by said cylindrical drum;

a second shaft journaled in said housing along the longitudinal axis of said housing;

a plurality of blunt beater bars carried by said shaft and extending radially from said shaft, said beater bars being positioned and sized for movement downwardly adjacent said inlet and over at least a portion of said outlet upon rotation of said shaft in one direction for loosening said hay flakes and discharging the loosened hay through said outlet;

drive means for rotating said shaft in said one direction;

a trough supported under said outlet in a position to receive loosened hay discharged through said outlet;

a hammer mill supported adjacent one end of said housing and having an inlet, one end of said trough extending to said hammer mill inlet; and conveying and mixing means supported in said trough for feeding the loosened hay into said hammer mill and for mixing a second material with said loosened hay.

5. A grinding and mixing apparatus for feed, including baled hay, comprising:

a cylindrical housing supported in a substantially horizontal position having an inlet in one side thereof of a size to receive flakes of bales of hay and having an outlet in the lower portion thereof;

a chute extending into said inlet, said chute being open along its top;

a conveyor in said chute for moving hay into said inlet;

a pair of parallel, spaced, elongated arms pivotally secured to said housing at one of their ends and supported as cantilevers from said housing;

a first shaft rotatably journaled in said arms between the free unattached ends of said arms;

a cylindrical drum rigidly mounted on said first shaft for rotation about its longitudinal axis upon rotation of said shaft, said drum being positioned to extend into the top of said chute adjacent said inlet in contact with hay being moved toward said inlet by said conveyor;

a plurality of parallel teeth arranged in circumferentially spaced rows along the length of said drum and extending at an identical acute angle from the periphery of said drum, said teeth all being extended in the same direction;

drive means for rotating said first shaft and said drum in such a direction that said teeth extend substantially upward on the downwardly moving side of said drum whereby individual flakes of hay are fed through said inlet by said drum;

a hexagonally cross-sectioned shaft rotatably journaled in said housing along the longitudinal axis of said housing;

a plurality of square plates having hexagonal apertures in the central portions thereof for receiving said hexagonally cross-sectioned shaft, said plates being secured on said hexagonally cross-sectioned shaft in spaced relation along the length thereof;

spacer washers on said hexagonally cross-sectioned shaft between adjacent plates for spacing the plates along said hexagonally cross-sectioned shaft;

blunt beater bars secured to the corners of said plates with one of said blunt beater bars secured to each corner of each of said plates, said plates being positioned on said hexagonally cross-sectioned shaft with the corners of adjacent plates positioned in offset relation to stagger the positions of said blunt beater bars along the length of said hexagonally cross-sectioned shaft;

drive means drivingly connected to said hexagonally cross-sectioned shaft for rotating said shaft in a direction for loosening said hay flakes and discharging the loosened hay through said outlet;

a secondary feed roller journaled in said housing parallel with said hexagonally cross-sectioned shaft at substantially the same level as the delivery end of said conveyor and between said conveyor and the paths of movement of said beater bars;

means for driving said secondary feed roller in a direction opposite to the direction of movement of said drum for guiding each of said hay flakes into the paths of movement of said blunt beater bars;

a trough supported under said outlet in a position to receive loosened hay discharged through said outlet;

a hammer mill supported adjacent one end of said housing and having an inlet with one end of said trough extending to said hammer mill inlet; and conveying and mixing means supported in said trough for feeding the loosened hay into said hammer mill and for mixing said loosened hay with another material.

6. The improvement claimed in claim 5 wherein said trough and conveying means are extended to an exposed position beyond the end of said housing opposite said hammer mill to receive grain or the like to be mixed and ground with said hay.

References Cited in the file of this patent

UNITED STATES PATENTS

| | | |
|---|---|---|
| 808,133 | Williams | Dec. 26, 1905 |
| 850,988 | Williams | Apr. 23, 1907 |
| 1,036,327 | Pickett | Aug. 20, 1912 |
| 1,561,093 | McCargar | Nov. 10, 1925 |
| 1,767,921 | Gately | June 24, 1930 |
| 1,770,198 | Chapple | July 8, 1930 |
| 1,905,152 | Clinton | Apr. 25, 1933 |
| 1,949,534 | Doyle | Mar. 6, 1934 |
| 1,967,313 | Holland-Letz | July 24, 1934 |
| 2,026,790 | Mankoff | Jan. 7, 1936 |
| 2,042,946 | Holland-Letz | June 2, 1936 |
| 2,172,096 | Alfred | Sept. 5, 1939 |
| 2,239,913 | Hall | Apr. 29, 1941 |
| 2,424,316 | Johnston | July 22, 1947 |
| 2,505,023 | Williamson | Apr. 25, 1950 |
| 2,685,900 | Cross | Aug. 10, 1954 |
| 2,711,964 | Weimer | June 28, 1955 |
| 2,762,288 | Guerrero | Sept. 11, 1956 |

FOREIGN PATENTS

| | | |
|---|---|---|
| 528,821 | Canada | Aug. 7, 1956 |